(12) United States Patent
Hiranuma

(10) Patent No.: US 11,782,459 B2
(45) Date of Patent: Oct. 10, 2023

(54) DEFLECTION AMOUNT CALCULATION DEVICE AND RECORDING MEDIUM ENCODING WITH A PROGRAM

(71) Applicant: FANUC CORPORATION, Yamanashi (JP)

(72) Inventor: Takuya Hiranuma, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 245 days.

(21) Appl. No.: 17/083,396

(22) Filed: Oct. 29, 2020

(65) Prior Publication Data

US 2021/0141398 A1 May 13, 2021

(30) Foreign Application Priority Data

Nov. 8, 2019 (JP) ................................ 2019-203497

(51) Int. Cl.
*G05D 3/20* (2006.01)
*G01B 21/22* (2006.01)
*G01B 21/32* (2006.01)

(52) U.S. Cl.
CPC ............. *G05D 3/20* (2013.01); *G01B 21/22* (2013.01); *G01B 21/32* (2013.01)

(58) Field of Classification Search
CPC . G05D 3/00; G05D 3/12; G01B 21/00; G01B 21/22; G01B 21/32; G05B 2219/49186; G05B 2219/49187; G05B 2219/49188; G05B 2219/49189; G05B 2219/49231; G05B 2219/49237; G05B 2219/49238; G05B 19/404; G06F 30/17; G06F 17/10; B25J 9/16; B25J 9/1692;
(Continued)

(56) References Cited

U.S. PATENT DOCUMENTS

| | | | | |
|---|---|---|---|---|
| 5,138,563 | A | * | 8/1992 | Debitsch .............. G01B 21/045 702/95 |
| 2003/0229415 | A1 | * | 12/2003 | Andersen ............. G05B 19/404 700/176 |
| 2018/0169860 | A1 | * | 6/2018 | Fukuoka ................ B25J 9/1641 |

(Continued)

FOREIGN PATENT DOCUMENTS

| | | | |
|---|---|---|---|
| JP | H06-208409 A | 7/1994 | |
| JP | 2004299010 A | * 10/2004 | ............ B25J 9/1638 |
| JP | 6494897 B1 | 4/2019 | |

*Primary Examiner* — Son T Le
*Assistant Examiner* — Matthew W. Baca
(74) *Attorney, Agent, or Firm* — Studebaker & Brackett PC

(57) ABSTRACT

A deflection amount calculation device configured to calculate a deflection amount in a reference direction of a component constituting an industrial machine, the deflection amount calculation device including: a deflection amount acquisition unit configured to acquire, as an actual deflection amount, a measured value of a deviation amount at a predetermined position before and after an actual load is applied to a given position of the component; an ideal deflection amount calculation unit configured to, based on an ideal model of the component, calculate an ideal value of the actual deflection amount as an ideal deflection amount; and a self-weight deflection amount calculation unit configured to, based on the actual deflection amount and the ideal deflection amount, calculate a self-weight deflection amount caused by a self-weight of the component.

8 Claims, 9 Drawing Sheets

(58) Field of Classification Search
CPC ...... B25J 9/1694; B25J 9/1638; B25J 9/1641; B23Q 11/001; B23Q 11/0028
See application file for complete search history.

(56) References Cited

U.S. PATENT DOCUMENTS

2020/0012253 A1* 1/2020 Kimata ................ G05B 13/048
2022/0258296 A1* 8/2022 Kono ................... G05B 19/404

* cited by examiner

FIG. 5
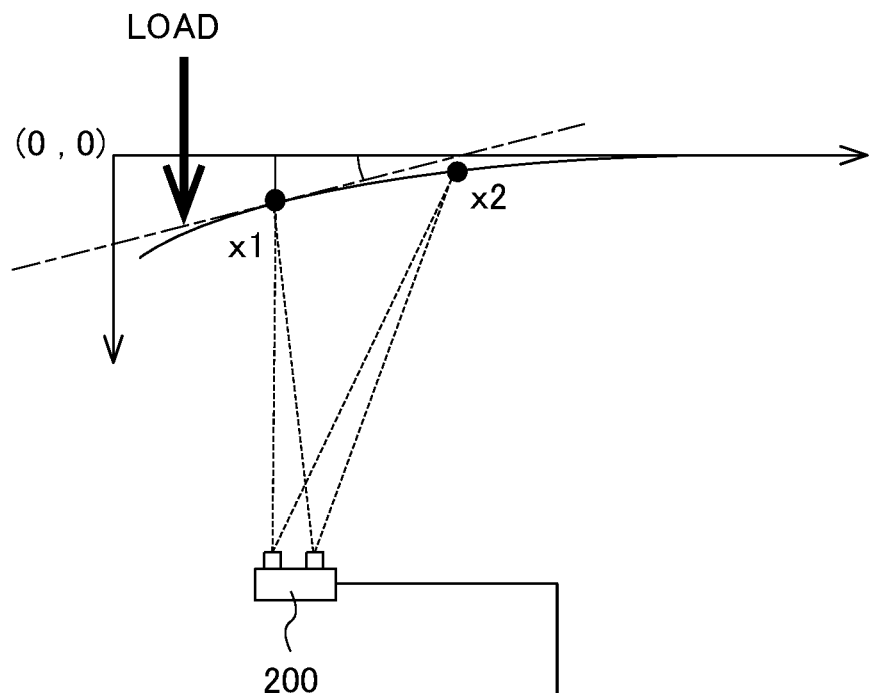
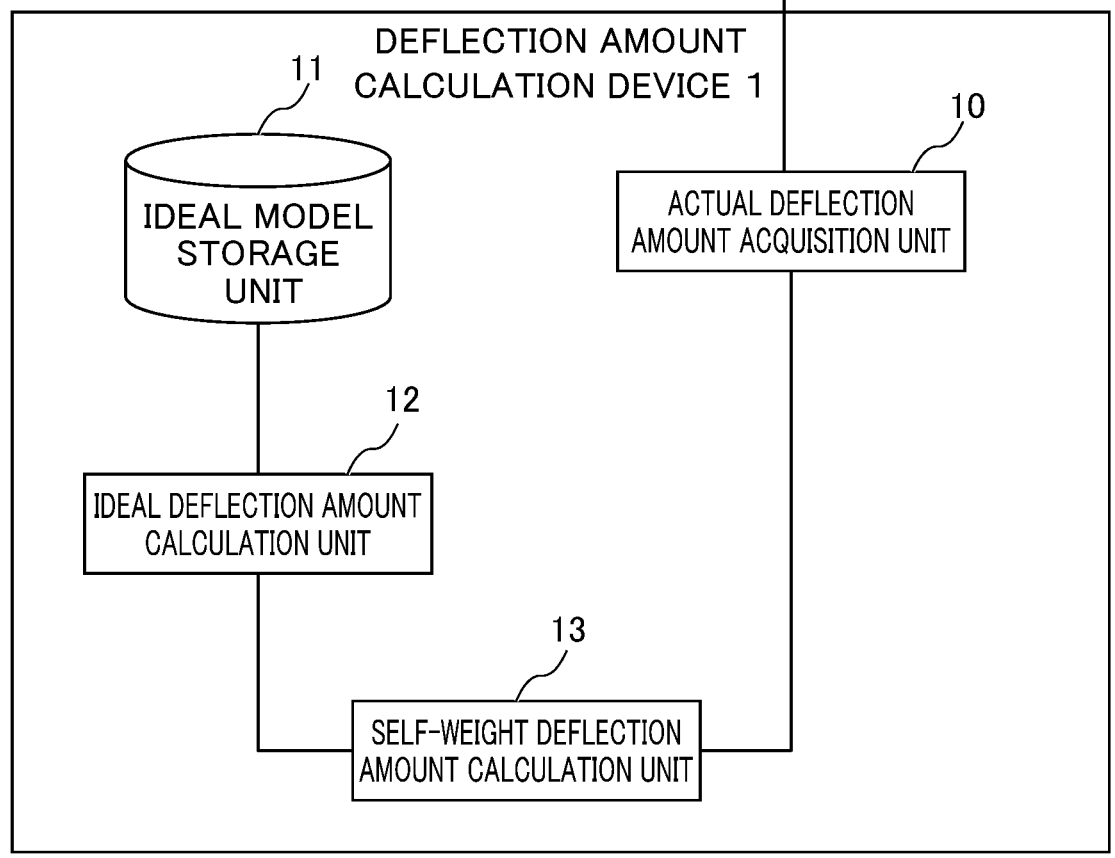

DEFLECTION AMOUNT CALCULATION DEVICE AND RECORDING MEDIUM ENCODING WITH A PROGRAM

This application is based on and claims the benefit of priority from Japanese Patent Application No. 2019-203497, filed on 8 Nov. 2019, the content of which is incorporated herein by reference.

BACKGROUND OF THE INVENTION

Field of the Invention

The present invention relates to a deflection amount calculation device and a recording medium encoded with a program.

Related Art

Conventionally, industrial machines are known in which, for example, a tool is arranged relative to a column by means of a beam. In this kind of industrial machine, the tool may, for example, be supported by the beam such that the tool is movable along the longitudinal direction of the beam.

In this kind of industrial machine, deformation such as slanting or deflection may occur due to the self-weight of the tool and the beam. Numerical control devices that compensate control values for operating industrial machines based on such deformations have been proposed (see, for example, Japanese Patent No. 6494897).

Patent Document 1: Japanese Patent No. 6494897

SUMMARY OF THE INVENTION

In the numerical control device described in Japanese Patent No. 6494897, a relative displacement between a workpiece and a tool is measured, and a displacement prediction model is created. The industrial machine is then operated to reduce a difference between the relative displacement and a predicted relative displacement value. Thus, the numerical control device described in Japanese Patent No. 6494897 allows for processing of the workpiece with increased precision.

On the other hand, in Japanese Patent No. 6494897, there is a need to measure an error amount between the three-dimensional positions of the workpiece and the tool. This required a vast number of measurements for the compensation, which made for a cumbersome process. It would thus be preferable if the deflection amount could be acquired more easily.

(1) The present disclosure relates to a deflection amount calculation device configured to calculate a deflection amount in a reference direction of a component constituting an industrial machine, the deflection amount calculation device including: a deflection amount acquisition unit configured to acquire, as an actual deflection amount, a measured value of a deviation amount at a predetermined position before and after an actual load is applied to a given position of the component; an ideal deflection amount calculation unit configured to, based on an ideal model of the component, calculate an ideal value of the actual deflection amount as an ideal deflection amount; and a self-weight deflection amount calculation unit configured to, based on the actual deflection amount and the ideal deflection amount, calculate a self-weight deflection amount caused by a self-weight of the component.

(2) In addition, the present disclosure relates to a deflection amount calculation device configured to calculate a deflection amount in a reference direction of a component constituting an industrial machine, the deflection amount calculation device including: a self-weight deflection amount calculation unit configured to, based on an ideal model of the component, calculate a self-weight deflection amount caused by a self-weight of the component; a deflection angle calculation unit configured to, based on the ideal model of the component, calculate a deflection angle of the component relative to the reference direction; and a position coordinate compensation unit configured to, based on the self-weight deflection amount and the deflection angle, compensate position coordinates of the component.

(3) In addition, the present disclosure relates to a recording medium encoded with a program configured to cause a computer to function as a deflection amount calculation device configured to calculate a deflection amount in a reference direction of a component constituting an industrial machine, the program causing the computer to function as: a deflection amount acquisition unit configured to acquire, as an actual deflection amount, a measured value of a deviation amount at a predetermined position before and after an actual load is applied to a given position of the component; an ideal deflection amount calculation unit configured to, based on an ideal model of the component, calculate an ideal value of the actual deflection amount as an ideal deflection amount; and a self-weight deflection amount calculation unit configured to, based on the actual deflection amount and the ideal deflection amount, calculate a self-weight deflection amount caused by a self-weight of the component.

(4) In addition, the present disclosure relates to a recording medium encoded with a program configured to cause a computer to function as a deflection amount calculation device configured to calculate a deflection amount in a reference direction of a component constituting an industrial machine, the program causing the computer to function as: a self-weight deflection amount calculation unit configured to, based on an ideal model of the component, calculate a self-weight deflection amount caused by a self-weight of the component; a deflection angle calculation unit configured to, based on the ideal model of the component, calculate a deflection angle of the component at a point on the machine relative to the reference direction; and a position coordinate compensation unit configured to, based on the self-weight deflection amount and the deflection angle, compensate position coordinates of the component at the point on the machine.

The present disclosure enables the provision of a deflection amount calculation device and a recording medium encoded with a program that more easily can acquire a deflection amount.

BRIEF DESCRIPTION OF THE DRAWINGS

FIG. 5 is a block diagram showing a configuration of the deflection amount calculation device according to the first embodiment;

DETAILED DESCRIPTION OF THE INVENTION

Figure 1:
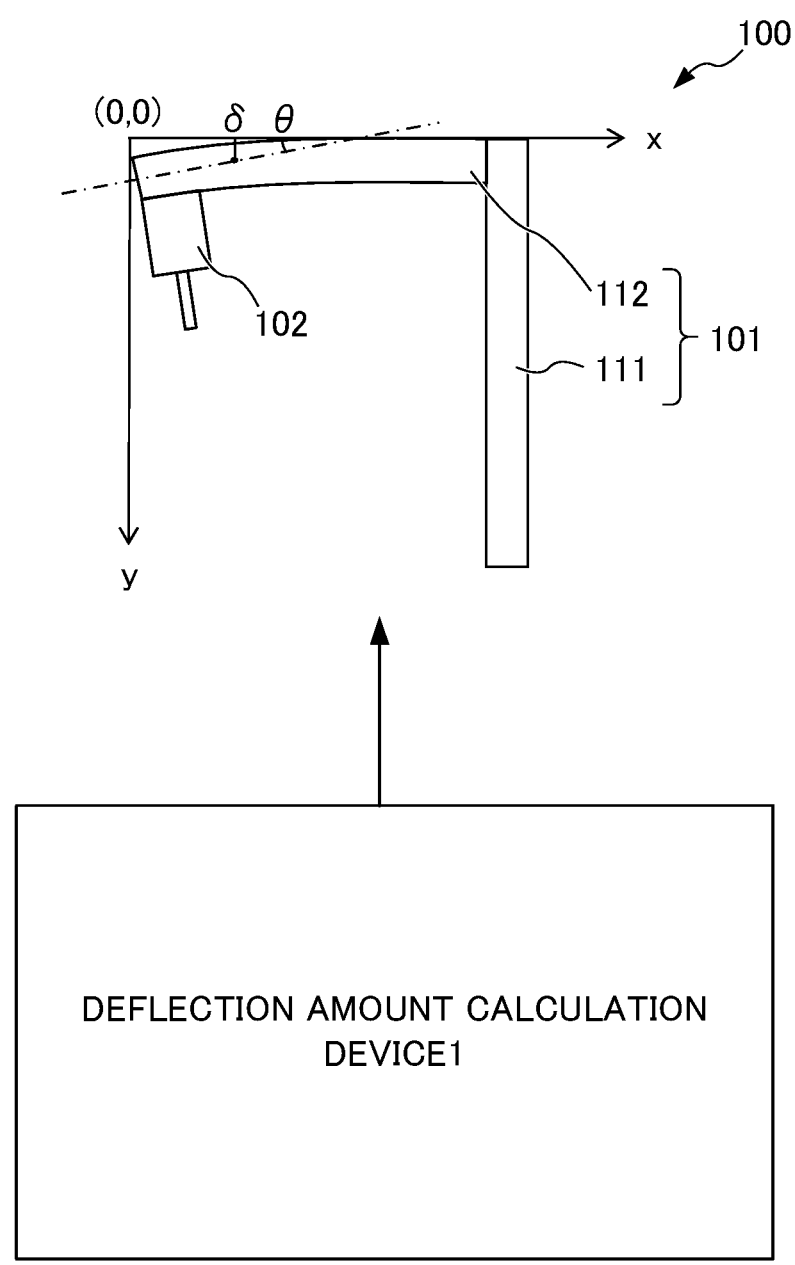
FIG. 1 is a schematic diagram showing a relation between a deflection amount calculation device and an industrial machine according to a first embodiment of the present disclosure.

A deflection amount calculation device 1 and program according to the embodiments of the present disclosure are described below with reference to FIGS. 1 to 9. First, a summary of the deflection amount calculation device 1 according to each embodiment will be described.

The deflection amount calculation device 1 is a device that controls, for example, an industrial machine 100. The deflection amount calculation device 1 is a device that calculates the amount of deflection of the components that constitute the industrial machine 100. As an example of such components, the deflection amount calculation device 1 calculates the deflection amount of a support 101 (see FIGS. 1 and 2) supporting the tool, and a table 114 (see FIGS. 3 and 4) supporting the workpiece 300. Specifically, the deflection amount calculation unit 1 calculates an actual deflection amount of the support 101 and the table 114 using an ideal model. That is to say, the deflection amount calculation device 1 calculates the actual deflection amount using a cantilever model for calculating a deflection amount of a cantilevered beam, or a both ends supported beam model for calculating a deflection amount of a both ends supported beam (fixed beam).

Figure 2:
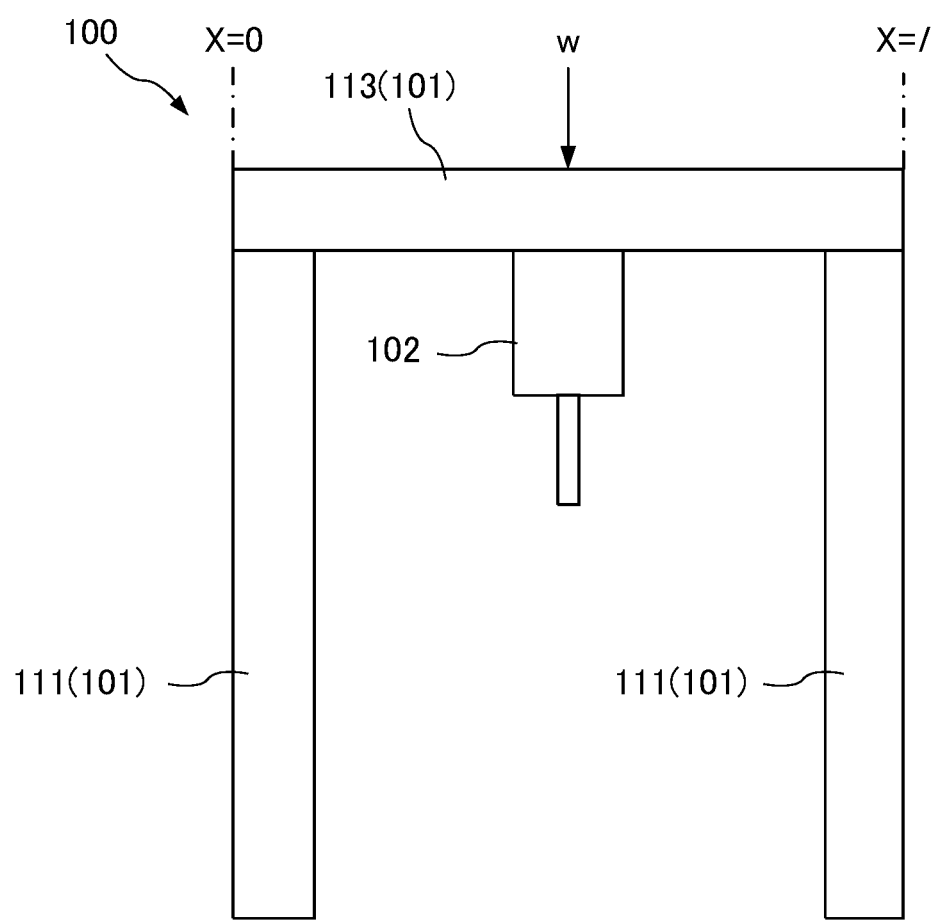
FIG. 2 is a schematic diagram showing another example of an industrial machine according to the first embodiment.
Figure 3:
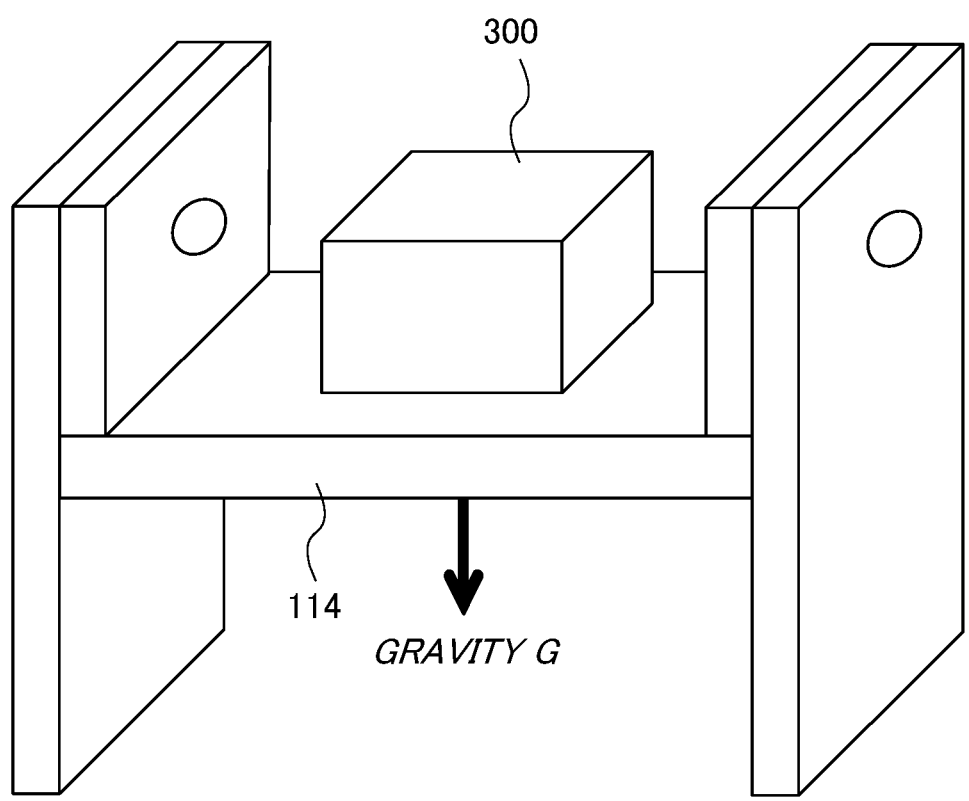
FIG. 3 is a schematic diagram showing yet another example of an industrial machine according to the first embodiment.
Figure 4:
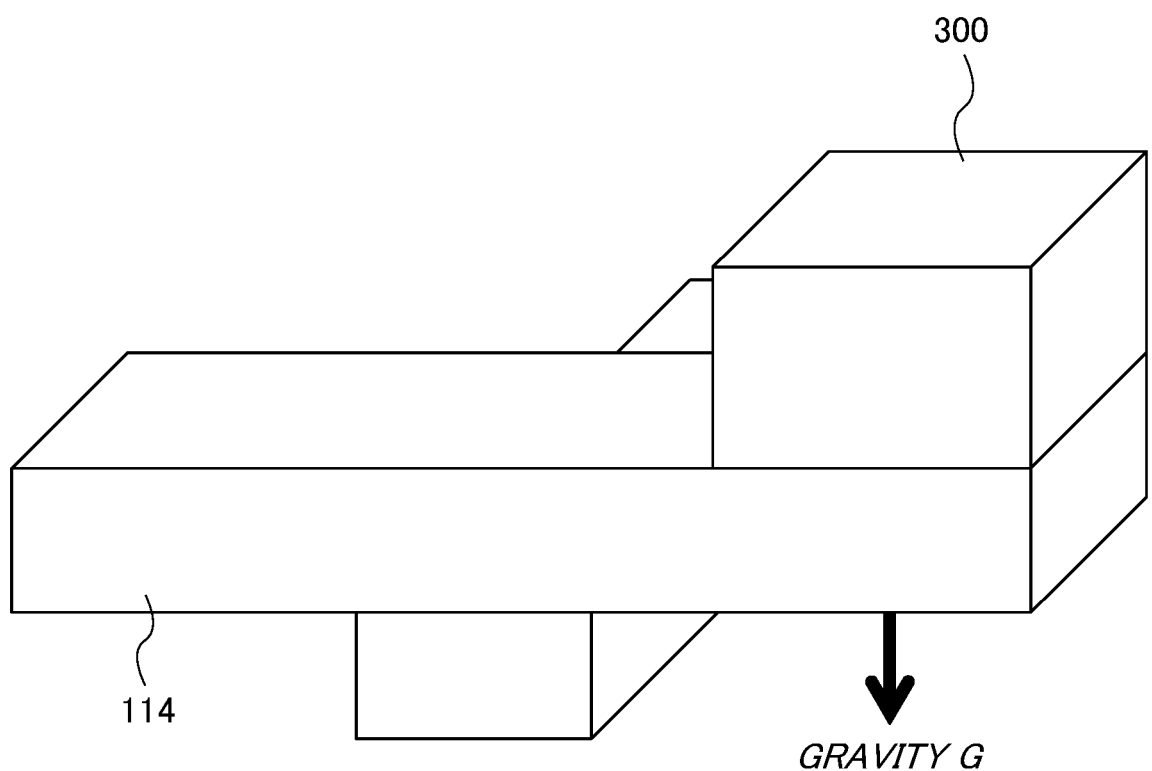
FIG. 4 is a schematic diagram showing yet another example of an industrial machine according to the first embodiment.

As an example, the deflection amount calculation device 1 calculates the deflection amount of a support 101 (cantilevered beam machine) supporting a tool 102 as shown in FIG. 1, using the cantilever model. Further, as another example, the deflection amount calculation device 1 calculates the deflection amount of a support 101 (double column machine) supporting a tool 102 as shown in FIG. 2, using the both ends supported beam model. Further, as yet another example, the deflection amount calculation device 1 calculates the deflection amount of a U-shaped table 114 as shown in FIG. 3, using the both ends supported beam model. Further, as yet another example, the deflection amount calculation device 1 calculates the deflection amount of a table 114 supporting a workpiece 300 at an end on a slider as shown in FIG. 4, using the cantilever model. In other words, the deflection amount calculation device 1 calculates a deflection amount of each of a plurality of components, using the cantilever model or the both ends supported beam model, which are ideal models. The deflection amount calculation device 1 can obtain an ideal value for a deflection amount at a point of each component on the machine (an arbitrary position of each component, e.g., the tip position of the tool 102, any given position on the support 101, and any given position on the table 114) by adding up the deflection amounts of affected components.

The deflection amount calculation device 1 then, for example, uses the ideal model to calculate the actual deflection amount of the support and the table (all components) caused by axial movement of the industrial machine. Thus, when any component is operated, the deflection amount calculation device 1 can determine how much an actual position of the component on the machine deviates from the result of a pure kinematics calculation. In the embodiments below, in order to facilitate understanding, the position (point on the machine) for which the deflection amount calculated is described as a position (tip position) of the tool 102.

Next, the configuration of the industrial machine 100 controlled by the deflection amount calculation device 1, and the deflection angle and deflection amount of the calculated ideal models, will be explained, divided into a cantilevered beam type and a both ends supported beam type.

(Cantilevered Beam Type)

The industrial machine 100 is composed of a plurality of components. The industrial machine 100 includes components such as a support 101 and a tool 102, as shown, for example, in FIG. 1. The industrial machine 100 is, for example, machine for processing a workpiece 300 placed on a table 114.

The support 101 is provided to support the tool 102. The support 101 includes a column 111 and a cantilevered beam 112.

The column 111 is, for example, cylindrical. The column 111 is arranged with its longitudinal direction oriented in an up-down direction (e.g., a vertical direction). In the below embodiments, the up-down direction (vertical direction) of the column 111 is also referred to as the y-axis direction. The column 111 directly or indirectly supports the base end side of the cantilevered beam 112.

The cantilevered beam 112 is, for example, cylindrical. One end of the cantilevered beam 112 supported by one end of the column 111. The cantilevered beam 112 is arranged, for example, with its longitudinal direction oriented in a lateral direction (e.g., a horizontal direction). In the below embodiments, the lateral direction in which the cantilevered beam 112 is oriented is also referred to as a reference direction (x-axis direction). The cantilevered beam 112 directly or indirectly supports the tool 102.

The tool 102 is, for example, a rotary tool. The tool 102 is supported by the cantilevered beam 112. Specifically, the tool 102 is supported to be movable along the longitudinal direction of the cantilevered beam 112. The tool 102 is supported by the cantilevered beam 112 in a state where, for example, the tip of the tool 102 is oriented vertically downwards.

In the industrial machine 100 described above, the support 101 deflects due to its own weight and the weight of the tool 102. In the ideal model of the industrial machine 100, where the length of the cantilevered beam 112 is $L_x$, the cross-sectional area of the cantilevered beam is $S_x$, and the density of the cantilevered beam 112 is $\rho_x$, the load caused by the self-weight the cantilevered beam 112 becomes:

$$W_x = L_x S_x \rho_x g \quad [\text{Math. 1}]$$

The load per unit length becomes:

$$w_x = \frac{W_x}{L_x} = S_x \rho_x g \quad [\text{Math. 2}]$$

A moment M(x) at a distance x from the free end (reference point) of the cantilevered beam 112 becomes:

$$M(x) = -\int_0^x wx(x-\xi)d\xi = -\frac{S_x \rho_x g x^2}{2} \quad [\text{Math. 3}]$$

Due to the deflection of the cantilevered beam 112 caused by the bending moment of the cantilevered beam 112, the bending moment acting on the cantilevered beam 112 becomes:

$$M(x) = -\frac{S_x \rho_x g x^2}{2} \quad [\text{Math. 4}]$$

When the deflection amount at a position x of the cantilevered beam 112 is represented by y, the following expression holds true, where E is Young's modulus and I is the second moment of area:

$$\frac{d^2 y}{dx^2} = -\frac{M}{EI} = \frac{S_x \rho_x g x^2}{2EI} \quad [\text{Math. 5}]$$

When the angle of the position x of the cantilevered beam 112 with the reference direction (x-axis direction) is represented by θ, the following expression holds true:

$$\frac{dy}{dx} = \theta(x) = \frac{S_x \rho_x g x^3}{3EI} + C_1 \quad [\text{Math. 6}]$$

When x equals $L_x$, θ equals 0, and so the following expression holds true:

$$\frac{dy}{dx} = \theta(x) = \frac{S_x \rho_x g x^3}{3EI} - \frac{S_x \rho_x g L_x^3}{3EI} \quad [\text{Math. 7}]$$

The deflection amount δ at the position x of the cantilevered beam 112 thus becomes:

$$\delta = y \int \theta(x) dx = \delta(x) = \frac{S_x \rho_x g x^4}{12EI} - \frac{S_x \rho_x g L_x^3 x}{3EI} + C_2 \quad [\text{Math. 8}]$$

When x equals $L_x$, δ equals 0, and so the following expression holds true:

$$y = \delta(x) = \frac{S_x \rho_x g x^4}{12EI} - \frac{S_x \rho_x g L_x^3 x}{3EI} + \frac{S_x \rho_x g L_x^4}{4EI}$$
$$= \frac{S_x \rho_x g}{12EI}(x^4 - 4L_x^3 x + 3L_x^4) \quad [\text{Math. 9}]$$

When the positions $x_1$, $x_2$ of the tool 102 are represented by:

$$0 \leq x_1 < x_2 \leq L_x \quad [\text{Math. 10}]$$

the mass of the tool 102 is represented by $M_t$, the load $W_t$ caused by the tool 102 is equal to $M_t g$, and the tool position $x_t$ at a distance x from the free end of the cantilevered beam is represented by:

$$x_1 \leq x_t, x_t \leq x_2 \quad [\text{Math. 11}]$$

then the bending moment M(x) acting on the cantilevered beam 112 due to the movement of the tool 102 along the cantilevered beam 112 becomes:

$$M(x) = 0 \, (x \leq x_t)$$

$$M(x) = -M_t g(x - x_t)(x \geq x_t) \quad [\text{Math. 12}]$$

The deflection of the cantilevered beam 112 due to the bending moment of the tool 102 becomes:

$$\frac{d^2 y}{dx^2} = \frac{M_t g(x - x_t)}{EI} = \frac{M_t g x}{EI} - \frac{M_t g x_t}{EI} \quad [\text{Math. 13}]$$

When the deflection amount in the y-axis direction and the angle at the position x of the cantilevered beam 112 are represented respectively by δ and θ, the following expression is obtained:

$$\theta(x) = \frac{dy}{dx} = \frac{M_t g x^2}{2EI} - \frac{M_t g x_t x}{EI} - \frac{M_t g L_x^2}{2EI} + \frac{M_t g L_x x_t}{EI} =$$
$$\frac{M_t g}{2EI}(x^2 - 2x_t x - L_x^2 + 2L_x x_t) \quad [\text{Math. 14}]$$

$$\delta(x) = \frac{M_t g}{6EI}(x^3 - 3x_t x^2 - (3L_x^2 - 6L_x x_t)x - 3L_x^2 x_t + 2L_x^3)$$

The deflection amount of the column 111 can then be obtained from the moment with the following Expression 15:

$$\frac{d^2 y}{dx^2} = -\frac{M}{EI} \quad [\text{Math. 15}]$$

Inertial force and vibration can also be obtained in the same way as gravity if the direction and magnitude of the force (or acceleration) is known. The deflection amount described above is calculated by a self-weight deflection amount calculation unit 13 of the deflection amount calculation device 1. The self-weight deflection amount calculation unit 13 calculates the deflection amount caused by the self-weight of the cantilevered beam 112 and the tool 102, based on the ideal model of the industrial machine 100.

(Both Ends Supported Beam Type)

A both ends supported beam type industrial machine 100 differs from the cantilevered beam type in that, for example, the support 101 is a double column support. In other words, it differs from the cantilevered beam type in that the industrial machine 100 has two columns 111 that support both ends of a both ends supported beam 113.

In this industrial machine 100, the support 101 deflects due to its own weight and the weight of the tool 102. In the ideal model of the industrial machine 100, when a distributed load is applied per unit length w of the both ends supported beam 113 itself with a length l, then the moment M(x) at a distance x from one end of the both ends supported beam 113 becomes:

$$M(x) = -\frac{wl^2}{12} + \frac{wlx}{2} - \frac{wx^2}{2} \quad [\text{Math. 16}]$$

-continued $$\frac{dy^2}{dx} = -\frac{M}{EI}$$

Here, E is Young's modulus. I is the second moment of area.

Since θ(0) equals 0 and δ(0) equals 0, the deflection angle θ(x) and the deflection amount δ(x) at a distance x from the end of the both ends supported beam 113 becomes:

$$\theta(x) = \frac{dy}{dx} = \frac{w}{2EI}\left(\frac{x^3}{3} - \frac{lx^2}{3} + \frac{l^2x}{3}\right)$$ [Math. 17]

$$\delta(x) = y = \frac{w}{12EI}\left(\frac{x^4}{2} - lx^3 + \frac{l^2x^2}{2}\right)$$

In the ideal model of the industrial machine 100, when a concentrated load W is applied to the position x of the both ends supported beam with a length l, then the moment M(x) at a distance x from one end of the both ends supported beam 113 can be obtained by the expression:

$$M(x) = \frac{Wx(l-x)^2(2x+l)}{l^3} - \frac{Wx(l-x)^2}{l^2} =$$ [Math. 18]

$$\frac{2Wx^2(l-x)^2}{l^3} = \frac{2W}{l^3}(x^4 - 2lx^3 + l^2x^2)$$

$$\frac{dy^2}{dx} = -\frac{M}{EI}$$

Here, E is Young's modulus. I is the second moment of area.

Since θ(0) equals 0 and δ(0) equals 0, the deflection angle θ(x) and the deflection amount δ(x) at a distance x from the end of the both ends supported beam 113 becomes:

$$\theta(x) = \frac{dy}{dx} = \frac{w}{2EI}\left(\frac{x^3}{3} - \frac{lx^2}{3} + \frac{l^2x}{3}\right)$$ [Math. 19]

$$\delta(x) = y = \frac{w}{12EI}\left(\frac{x^4}{2} - lx^3 + \frac{l^2x^2}{2}\right)$$

With regards to the deflection amount calculation device 1 and program according to the embodiments described below, for the sake of simplicity, an example is described in which a deflection amount in reference direction of a tool 102, directly or indirectly supported by a support 101 having a column 111 and a cantilevered beam 112 (cantilevered type machine), is calculated. Further, in the embodiments described below, the reference direction is the x direction, and is described using the position of the free end of the cantilevered beam 112 as a reference point. In addition, when calculating a deflection amount for a configuration considered a both ends supported beam type, such as the double column machine or the U-shaped table 114 in FIGS. 2 and 3, the deflection angle and deflection amount of the both ends supported beam model is used.

First Embodiment

Next, a deflection amount calculation device 1 and program according to a first embodiment of the present disclosure will be described with reference to FIG. 5. Compared to the industrial machine 100 indicated in the ideal model described above, the deflection amount calculation device 1 and program according to the present embodiment are more suited for calculating the deflection amount in cases where calculating the deflect on amount is difficult. The deflection amount calculation device 1 and program can, for example, calculate the deflection amount for an industrial machine 100 that has a complex shape or configuration, or is composed of several different materials. As shown in FIG. 5, the deflection amount calculation device 1 includes an actual deflection amount acquisition unit 10, an ideal model storage unit 11, an ideal deflection amount calculation unit 12, and a self-weight deflection amount calculation unit 13. It should be noted that deflection is a so-called dynamic error, which changes depending on a movement of the tool 102 in the x-axis direction.

The actual deflection amount acquisition unit 10 is realized, for example, by the operation of a CPU. The actual deflection amount acquisition unit 10 acquires, as the actual deflection amount, a measured value of a deviation amount at a predetermined position before and after an actual load is applied to a given position of the support 101. In the present embodiment, the actual deflection amount acquisition unit 10 acquires a given position of the cantilevered beam 112 from a sensor 200 that measures the position of the cantilevered beam 112. The actual deflection amount acquisition unit 10 acquires, for example, a deviation amount δ in the y-axis direction before and after application of the load at a given position as a deviation amount.

The ideal model storage unit 11 is, for example, a secondary storage medium such as a hard disk, etc. The ideal model storage unit 11 stores information regarding the mechanical configurations of an ideal support 101 and tool 102 as configuration information. The term "ideal" means exhibiting characteristics in the form of expected values that are as close as possible to the deflection amount δ and the angle θ shown in Expression 14 described above. The ideal model storage unit 11 stores, for example, the mechanical configuration of an industrial machine 100 with a deflection amount calculated as described above as configuration information.

The ideal deflection amount calculation unit 12 is realized, for example, by the operation of a CPU. Based on the ideal model of the industrial machine 100, the ideal deflection amount calculation unit 12 calculates an ideal value of the actual deflection amount as an ideal deflection amount.

The self-weight deflection amount calculation unit 13 is realized, for example, by the operation of a CPU. Based on the actual deflection amount and the ideal deflection amount, the self-weight deflection amount calculation unit 13 calculates a self-weight deflection amount caused by the self-weight of the support 101 and the tool 102. The self-weight deflection amount calculation unit 13 calculates, for example, the difference between the actual deflection amount and the ideal deflection amount as the self-weight deflection amount.

Next, the flow of operation of the deflection amount calculation device 1 according to the present embodiment will be described.

First, the actual deflection amount acquisition unit 10 acquires an actual deflection amount at a given position, using a signal output from the sensor. In the present embodiment, the actual deflection amount acquisition unit 10 acquires five patterns with different measuring positions and load amounts as the actual deflection amount.

Next, the ideal deflection amount calculation unit 12 reads the configuration information of the ideal model from the ideal model storage unit 11. The ideal deflection amount calculation unit 12 calculates an ideal deflection amount $\delta_1(x)$, using the following Expression 20. It should be noted that Expression 20 is essentially identical to Expression 14.

$$\delta_1(x) = \frac{W}{6EI}(x^3 - 3x_tx^2 - (3L_x^2 - 6L_xx_t)x - 3L_x^2x_t + 2L_x^3) \quad \text{[Math. 20]}$$

Next, the self-weight deflection amount calculation unit 13 calculates a deflection model caused by the self-weight of the cantilevered beam 112 (deflection amount $\delta_2(x)$) as the following Expression 21.

$$\delta_2(x) = ax^4 + bx^3 + cx^2 + dx + e \quad \text{[Math. 21]}$$

Specifically, the self-weight deflection amount calculation unit 13 calculates $\delta_2(x)$, with the actual deflection amount represented by $\delta(x)$, using the following expression:

$$\delta(x) = \delta_1(x) + \delta_2(x) \quad \text{[Math. 22]}$$

By applying the actual deflection amount of each of the five patterns, the self-weight deflection amount calculation unit 13 can find the coefficients a, b, c, d, and e of Expression 21.

Next, the program will be described. The program may be stored using various types of non-transitory computer-readable media, and may be provided to a computer. Non-transitory computer-readable media include various types of tangible storage media. Examples of non-transitory computer-readable media include magnetic storage media (e.g., flexible discs, magnetic tapes, hard disk drives), magneto-optical storage media (e.g., magneto-optical discs), CD-ROM (Read Only Memory), CD-R, CD-R/W, and semiconductor memories (e.g., mask ROM, PROM (programmable ROM), EPROM (erasable PROM), flash ROM, RAM (random access memory)). The display program may also be provided to a computer by means of various types of transitory computer-readable media. Examples of transitory computer-readable media include electrical signals, optical signals, and electromagnetic waves. Transitory computer-readable media may provide the program to a computer through wired communication paths such as electrical wires or optical fibers, or through wireless communication paths.

The deflection amount calculation device 1 and program according to the first embodiment exhibit the following effect.

(1) A deflection amount calculation device 1 configured to calculate a deflection amount in a reference direction of a component constituting an industrial machine, the deflection amount calculation device 1 including an actual deflection amount acquisition unit 10 configured to acquire, as an actual deflect on amount, a measured value of a deviation amount at a predetermined position before and after an actual load is applied to a given position of the component; an ideal deflection amount calculation unit 12 configured to, based on an ideal model of the component, calculate an ideal value of the actual deflection amount as an ideal deflection amount; and a self-weight deflection amount calculation unit 13 configured to, based on the actual deflection amount and the ideal deflection amount, calculate a self-weight deflection amount caused by a self-weight of the component. Thus, even in cases where it is difficult to calculate the deflection amount compared to the industrial machine 100 shown in the ideal model, the deflection amount can be calculated with a low number of measurements. This makes it easier to obtain the deflection amount.

Second Embodiment

Figure 6:
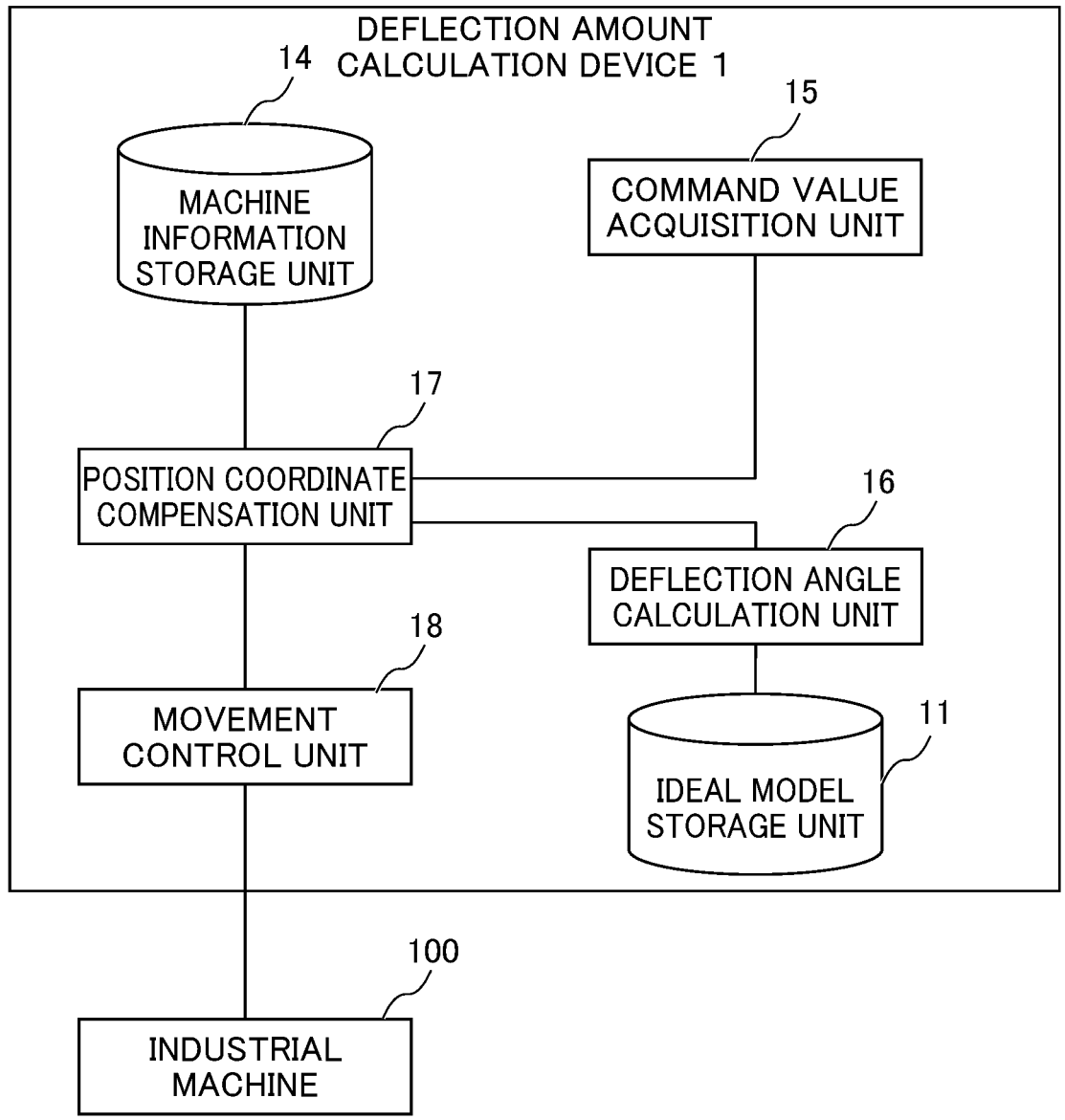
FIG. 6 is a block diagram showing a configuration of a deflection amount calculation device according to a second embodiment of the present disclosure.
Figure 7:
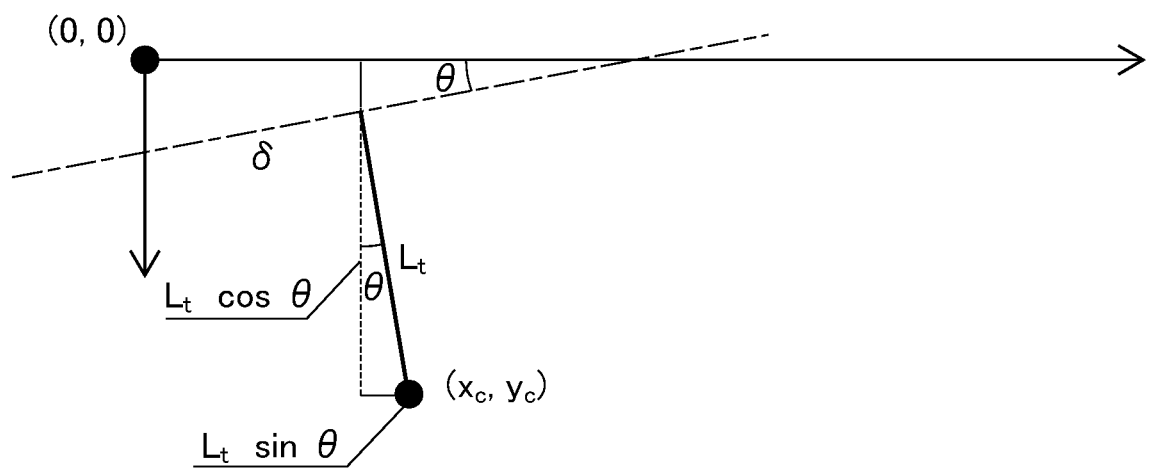
FIG. 7 is a conceptual view showing a position of a command value of the deflection amount calculation device according to the second embodiment.

Next, a deflection amount calculation device 1 and program according to a second embodiment of the present disclosure will be described with reference to FIGS. 6 and 7. In the description of the second embodiment, elements that are the same as in the embodiment described above are given the same reference numerals, and the description thereof is omitted or simplified. The deflection amount calculation device 1 and program according to the second embodiment are able to perform compensation of position coordinates of the tool 102 based on a deflection amount and deflection angle caused by the self-weight of the cantilevered beam 112 and the tool 102. As shown in FIG. 6, the deflection amount calculation device 1 includes a mechanical information storage unit 14, a command value acquisition unit 15, a deflection angle calculation unit 16, a position coordinate compensation unit 17, and a movement control unit 18. The deflection amount calculation device 1 is provided, for example, as a function of a numerical control device (not shown).

The mechanical information storage unit 14 is, for example, a secondary storage medium such as a hard disk. The mechanical information storage unit 14 stores mechanical information regarding the industrial machine 100, reflecting the deflection model described above. The mechanical information storage unit 14 stores, for example, information on a mechanical configuration, including a deflection amount with respect to the position of the tool 102. Specifically, the mechanical information storage unit 14 stores mechanical information regarding the industrial machine 100, reflecting a deflection model obtained by the ideal model or the first embodiment described above.

The command value acquisition unit 15 is realized, for example, by the operation of a CPU. The command value acquisition unit 15 acquires, for example, a command value based on an operation command obtained by a preset operation program.

The deflection angle calculation unit 16 realized, for example, by the operation of a CPU. The deflection angle calculation unit calculates a deflection angle of the tool 102 relative to the reference direction based on the ideal model of the support 101.

The position coordinate compensation unit 17 is realized, for example, the operation of a CPU. The position coordinate compensation unit 17 performs compensation of position coordinates of the tool 102 based on the self-weight deflection amount and deflection angle of the cantilevered beam 112 and the tool 102. For example, the position coordinate compensation unit 17 performs compensation of the position coordinates of the tool 102 using the deflection amount and deflection angle obtained depending on the position of the tool 102 that is scheduled to move based on an acquired command value.

The movement control unit 18 is realized, for example, by the operation of a CPU. For example, the movement control unit 18 outputs a pulse to the industrial machine 100 to move the tool 102 to a position that has been compensated by the position coordinate compensation unit 17.

Next, an operation of the deflection amount calculation device 1 according to the present embodiment will be described. First, the command value acquisition unit 15 acquires a command value based on an operation command. Next, the deflection angle calculation unit 16, calculates a deflection angle. Next, the position coordinate compensation unit 17 acquires mechanical information from the mechanical information storage unit 14. In addition, the position coordinate compensation unit 17, using the acquired mechanical information and the command value, compensates the position coordinates of the tool 102 indicated by the command value. As shown in FIG. 7, when the command value is, for example, $x=x_c$, $y=y_c$, the position coordinate compensation unit 17 compensates the command value as shown in Expression 23 below (position coordinate of the tool 102), taking the deflection amount δ and the deflection angle θ into account.

$$x = x_c - L_t \sin\theta$$

$$y = (1 - \cos\theta)L_t - \delta \quad \text{[Math. 23]}$$

Moreover, δ(x) and θ(x) are defined as in Expression 24.

$$\delta(x) = \frac{S_x \rho_x g}{12EI}(x^4 - L_x^4) + \frac{M_t g}{6EI}(x^3 - L_x^3) - \frac{M_t g x_t}{2EI}(x^2 - L_x^2) - \quad \text{[Math. 24]}$$

$$\left(\frac{S_x \rho_x g L_x^3}{3EI} + \frac{M_t g L_x^2}{2EI} - \frac{M_t g L_x x_t}{EI}\right)(x - L_x)$$

$$\theta(x) = \frac{S_x \rho_x g}{3EI}(x^3 - L_x^3) + \frac{M_t g}{2EI}(x^2 - L_x^2) - \frac{M_t g x_t}{EI}(x - L_x)$$

The movement control unit 18 outputs a pulse to the industrial machine 100 to move the tool 102 to the compensated position.

The deflection amount calculation device 1 and program according to the second embodiment exhibit the following effect.
(2) The deflection amount calculation device 1 further includes a deflection angle calculation unit 16 configured to, based on an ideal model of the support 101 calculate a deflection angle of the component relative to the reference direction; and a position coordinate compensation unit 17 configured to, based on the self-weight deflection amount and the deflection angle, compensate position coordinates of the component at a point on the machine. Thus, the tip of the tool 102 can be positioned in a position that has been compensated with consideration to the actual deflection amount. This allows for improved processing precision.

Third Embodiment

Figure 8:
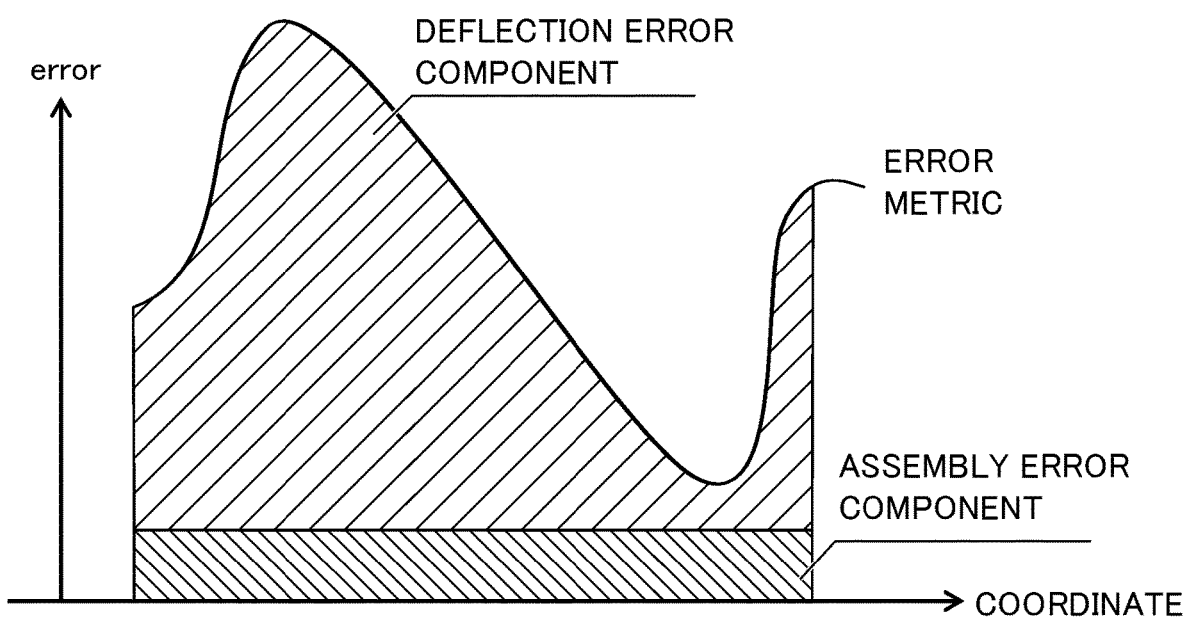
FIG. 8 is a conceptual view showing an assembly error component of a deflection amount calculation device according to a third embodiment of the present disclosure.

Next, a deflection amount calculation device 1 and program according to a third embodiment of the present disclosure will be described with reference to FIGS. 8 and 9. In the description of the third embodiment, elements that are the same as in the embodiment described above are given the same reference numerals, and the description thereof is omitted or simplified. In addition to the deflection amount, the deflection amount calculation device 1 and program according to the third embodiment also compensate for an error component caused by assembly errors. In other words, the deflection amount calculation device 1 and program according to the third embodiment compensate for an error component in the form of assembly errors that are different errors than deflection. The deflection amount calculation device 1 and program according to the third embodiment compensates for an error component in the form of displacement errors due to not only assembly, but also, for example, due to aging. Moreover, as shown in FIG. 8, the deflection amount calculation device 1 and program according to the third embodiment calculates the assembly error component by removing a deflection error component from the error metric.

Figure 9:
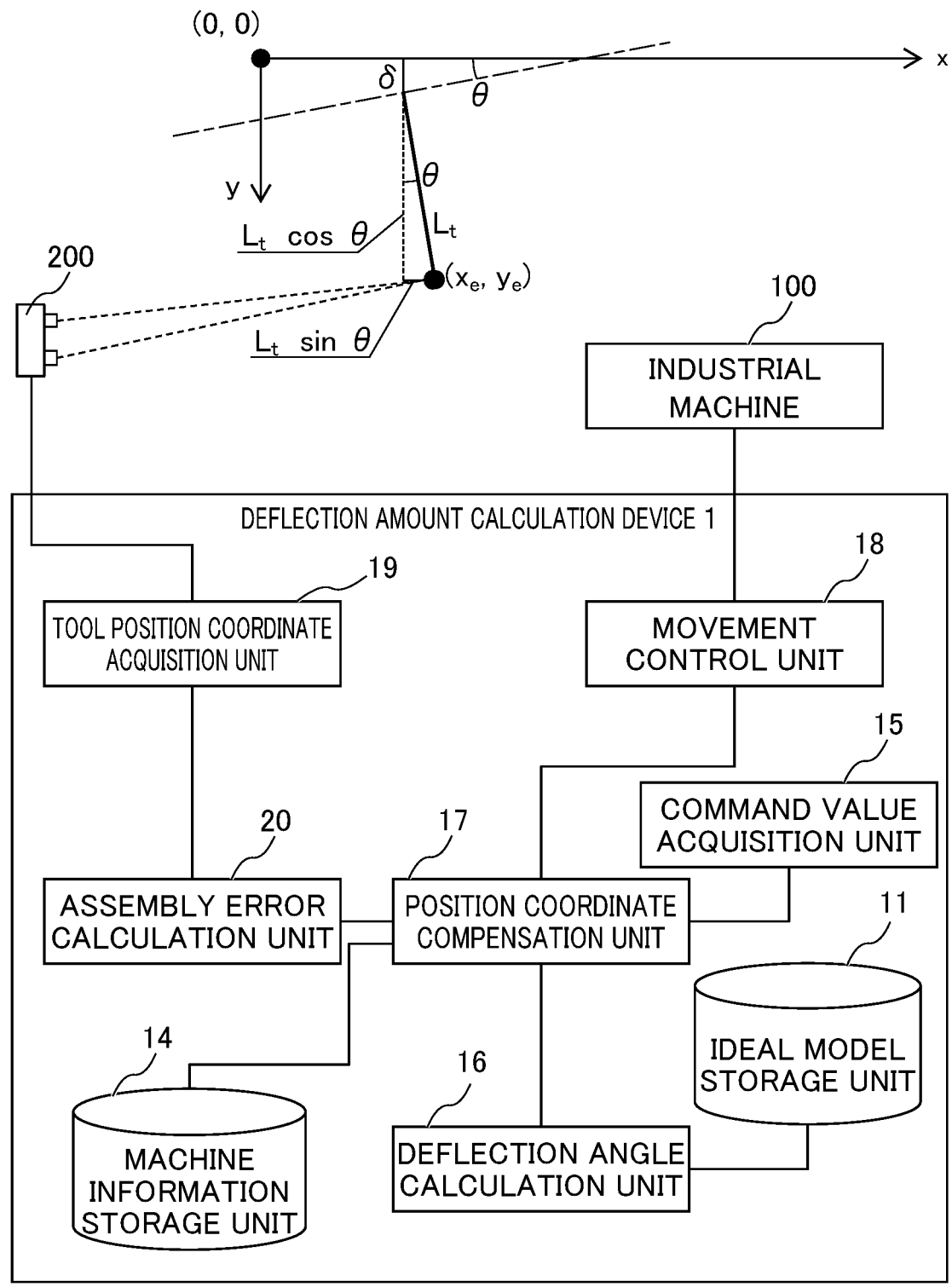
FIG. 9 is a block diagram showing the deflection amount calculation device according to the third embodiment.

As shown in FIG. 9, the deflection amount calculation device 1 and program according to the third embodiment includes, in addition to the configuration according to the second embodiment, a tool position coordinate acquisition unit 19 and an assembly error calculation unit 20. In addition, the deflection amount calculation device 1 and program according to the third embodiment differ from the first and second embodiments in that the position coordinate compensation unit 17 further compensates the position coordinates of the tool 102 based on the assembly error calculated with consideration to the assembly error.

The tool position coordinate acquisition unit 19 is realized, for example, by the operation of a CPU. The tool position coordinate acquisition unit 19 acquires the actual position coordinates of the tool 102. For example, the tool position coordinate acquisition unit 19 acquires the actual position coordinates of the tool 102 based on a signal received from a sensor 200.

The assembly error calculation unit 20 is realized, for example, by the operation of a CPU. The assembly error calculation unit 20 calculates the assembly error of the industrial machine 100 based on the actual position coordinates and the compensated position coordinates of the tool 102. For example, the assembly error calculation unit 20 calculates the difference in deflection amount from the actual position coordinates of the tool 102 as the assembly error.

Next, the flow of operation of the deflection amount calculation device 1 and program according to the present embodiment will be described. First, the tool position coordinate acquisition unit 19 acquires position coordinates of the tool 102 from the sensor 200. If there are no errors other than deflection, the position coordinates $x_e$, $y_e$ of the tool 102 will be as in expression 25.

$$x_e = x_c + L_t \sin\theta$$

$$y_e = \delta + L_t \cos\theta \quad \text{[Math. 25]}$$

In other words, if Expression 26 does not become 0, the value is considered an error other than deflection.

$$x_e - (x_c + L_t \sin\theta)$$

$$y_e - (\delta + L_t \cos\theta) \quad \text{[Math. 26]}$$

The position coordinate compensation unit 17 adds the assembly error obtained in Expression 26 to the deflection amount and compensates the tool position of the command value.

The deflection amount calculation device 1 and program according to the third embodiment exhibit the following effect.
(3) The deflection amount calculation device 1 further includes a tool position coordinate acquisition unit 19 configured to acquire actual position coordinates of the component at a point on the machine; and an assembly error calculation unit 20 configured to, based on the actual position coordinates and the compensated position coordinates of the component at the point on the machine, calculate an assembly error of the industrial machine 100, wherein the position coordinate compensation unit 17, based on the calculated assembly error, further compensates the position coordinates of the component at the position on the machine. This allows for compensation of the position of the tool 102 while also taking the innate assembly error of the industrial machine 100 into consideration. This allows for improved processing precision of the industrial machine 100.

While preferred embodiments of the deflection amount calculation device and program according to the present disclosure have been described above, the present disclosure is not limited to the embodiments described above, but may be modified as necessary. For example, in the first embodiment described above, the actual deflection amount acquisition unit 10 acquires the actual deflection amount using a sensor 200, but the invention is not so limited. The actual deflection amount acquisition unit 10 may acquire the actual deflection amount through a simulation such as CAD etc.

Further, in the second embodiment described above, when the force acting on the cantilevered beam 112 is a constant moment, movement of the tool 102 in the y-axis direction can be considered a movement on a big arc. For example, movement of the tool 102 in the y-axis direction can be considered as in Expression 27 below, where the radius of the arc is represented by R. This concept may be included in the deflection model.

$$\frac{1}{R} = \frac{M}{EI} \qquad \text{[Math. 27]}$$

In addition, the first to third embodiments may be appropriately combined to configure the deflection amount calculation device 1 and program. In other words, one deflection amount calculation device 1 may include any combination of the first to third embodiments.

In addition, in the second and third embodiments described above, the deflection amount calculation device 1 is described as having a deflection angle calculation unit 16, but the invention is not so limited. The mechanical information storage unit 14 may store a deflection angle model together with the mechanical information. The position coordinate correction unit 17 may read the deflection angle model from the mechanical information storage unit 14 to acquire the deflection angle.

EXPLANATION OF REFERENCE NUMERALS

1 Deflection amount calculation device
10 Actual deflection amount acquisition unit
12 ideal deflection amount calculation unit
13 Self-weight deflection amount calculation unit
15 Command value acquisition unit
16 Deflection angle calculation unit
17 Position coordinate compensation unit
19 Tool position coordinate acquisition unit
20 Assembly error calculation unit
100 Industrial machine
101 Support
102 Tool
111 Column
112 Cantilevered beam

What is claimed is:

1. A deflection amount calculation device configured to calculate a deflection amount in a reference direction of a component constituting an industrial machine, the deflection amount calculation device comprising a processor, the processor being configured to:
   acquire, as actual deflection amounts, a plurality of measured values, each of which indicates a deviation amount at a predetermined position before and after a different actual load is applied to a different given position of the component;
   calculate, based on an ideal model of the component, a plurality of ideal values of the actual deflection amounts as ideal deflection amounts; and
   obtain coefficients of a self-weight deflection model based on the actual deflection amounts and the ideal deflection amounts, and calculate a self-weight deflection amount at the predetermined position caused by a self-weight of the component in accordance with the self-weight deflection model.

2. The deflection amount calculation device according to claim 1, wherein the processor is further configured to:
   calculate, based on an ideal model of a support, a deflection angle of the component relative to the reference direction; and
   compensate, based on the self-weight deflection amount and the deflection angle, position coordinates of the component at a point on the machine.

3. The deflection amount calculation device according to claim 2, wherein the processor is further configured to:
   acquire actual position coordinates of the component at a point on the machine; and
   calculate, based on the actual position coordinates and the compensated position coordinates of the component at the point on the machine, an assembly error of the industrial machine,
   wherein:
   the processor, based on the calculated assembly error, further compensates the position coordinates of the component at the point on the machine.

4. The deflection amount calculation device according to claim 1, wherein the processor acquires five measured values as the actual deflection amounts.

5. A deflection amount calculation device configured to calculate a deflection amount in a reference direction of a component constituting an industrial machine, the deflection amount calculation device comprising a processor, the processor being configured to:
   obtain coefficients of a self-weight deflection model based on an ideal model of the component, and calculate a self-weight deflection amount caused by a self-weight of the component in accordance with the self-weight deflection model;
   calculate, based on the ideal model of the component, a deflection angle of the component relative to the reference direction;
   compensate, based on the self-weight deflection amount and the deflection angle, position coordinates of the component;
   acquire actual position coordinates of the component at a point on the machine; and
   calculate, based on the actual position coordinates and the compensated position coordinates of the component at the point on the machine, an assembly error of the industrial machine,
   wherein the processor, based on the calculated assembly error and an error due to aging of the component, further compensates the position coordinates of the component at the point on the machine.

6. A non-transitory recording medium encoded with a program configured to cause a computer to function as a deflection amount calculation device configured to calculate a deflection amount in a reference direction of a component constituting an industrial machine,
   the program causing the computer to function as:
   a deflection amount acquisition unit configured to acquire, as actual deflection amounts, a plurality of measured values, each of which indicates a deviation amount at a predetermined position before and after a different actual load is applied to a different given position of the component;
   an ideal deflection amount calculation unit configured to, based on an ideal model of the component, calculate a plurality of ideal values of the actual deflection amounts as ideal deflection amounts; and a self-weight deflection amount calculation unit configured to obtain coefficients of a self-weight deflection model based on the actual deflection amounts and the ideal deflection amounts, and calculate a self-weight deflection amount at the predetermined position caused by a self-weight of the component in accordance with the self-weight deflection model.

7. The non-transitory recording medium encoded with a program according to claim 6, wherein the deflection amount acquisition unit acquires five measured values as the actual deflection amounts.

8. A non-transitory recording medium encoded with a program configured to cause a computer to function as a deflection amount calculation device configured to calculate a deflection amount in a reference direction of a component constituting an industrial machine, the program causing the computer to function as:
a self-weight deflection amount calculation unit configured to obtain coefficients of a self-weight deflection model based on an ideal model of the component, and calculate a self-weight deflection amount caused by a self-weight of the component in accordance with the self-weight deflection model;

a deflection angle calculation unit configured to, based on the ideal model of the component, calculate a deflection angle of the component at a point on the machine relative to the reference direction;

a position coordinate compensation unit configured to, based on the self-weight deflection amount and the deflection angle, compensate position coordinates of the component at the point on the machine;

a tool position coordinate acquisition unit configured to acquire actual position coordinates of the component at a point on the machine; and an assembly error calculation unit configured to, based on the actual position coordinates and the compensated position coordinates of the component at the point on the machine, calculate an assembly error of the industrial machine, wherein the position coordinate compensation unit, based on the calculated assembly error and an error due to aging of the component, further compensates the position coordinates of the component at the point on the machine.

* * * * *